United States Patent
Xiong et al.

(10) Patent No.: US 12,443,847 B2
(45) Date of Patent: Oct. 14, 2025

(54) TASK PROCESSING METHOD AND DEVICE BASED ON NEURAL NETWORK

(71) Applicant: BIGO TECHNOLOGY PTE. LTD., Singapore (SG)

(72) Inventors: Yi Xiong, Guangzhou (CN); Songsong Yi, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 1134 days.

(21) Appl. No.: 17/284,201

(22) PCT Filed: Aug. 23, 2019

(86) PCT No.: PCT/CN2019/102139
§ 371 (c)(1),
(2) Date: Apr. 9, 2021

(87) PCT Pub. No.: WO2020/073742
PCT Pub. Date: Apr. 16, 2020

(65) Prior Publication Data
US 2021/0357759 A1    Nov. 18, 2021

(30) Foreign Application Priority Data
Oct. 10, 2018 (CN) .......................... 201811180174.5

(51) Int. Cl.
*G06N 3/082* (2023.01)
*G06F 9/48* (2006.01)
*G06N 3/063* (2023.01)

(52) U.S. Cl.
CPC ............. *G06N 3/082* (2013.01); *G06F 9/485* (2013.01); *G06F 9/4881* (2013.01); *G06N 3/063* (2013.01)

(58) Field of Classification Search
CPC ....... G06F 9/485; G06F 9/4881; G06N 3/045; G06N 3/063; G06N 3/08; G06N 3/082
See application file for complete search history.

(56) References Cited

U.S. PATENT DOCUMENTS

| | | | |
|---|---|---|---|
| 10,878,314 B2* | 12/2020 | Nagaraja | G06N 3/063 |
| 2012/0089812 A1* | 4/2012 | Smith | G06F 9/4843 |
| | | | 712/21 |

(Continued)

FOREIGN PATENT DOCUMENTS

| | | |
|---|---|---|
| CN | 101819651 A | 9/2010 |
| CN | 104657111 A | 5/2015 |

(Continued)

OTHER PUBLICATIONS

Gurgel, Saskya TA, and Andrei de A. Formiga. "Parallel implementation of feedforward neural networks on GPUs." 2013 Brazilian Conference on Intelligent Systems. IEEE, 2013. (Year: 2013).*

(Continued)

*Primary Examiner* — Randall K. Baldwin
(74) *Attorney, Agent, or Firm* — Kolitch Romano Dascenzo Gates LLC (57) ABSTRACT

Provided is a task processing method based on a neural network, including: acquiring input data, wherein the input data is intended to trigger thread tasks, and is source input data or cache exchange data; generating processing result data by scheduling at least two corresponding module threads in parallel based on at least two triggered thread tasks to process the input data, wherein the at least two module threads respectively correspond to at least two network modules in the neural network; and outputting the processing result data to a cache as the cache exchange data (Continued)

of module threads except the at least two module threads, or outputting the processing result data as a processing result of the source input data.

18 Claims, 5 Drawing Sheets

(56) References Cited

U.S. PATENT DOCUMENTS

| | | | | |
|---|---|---|---|---|
| 2014/0143509 | A1* | 5/2014 | Vorbach | G06F 8/447 |
| | | | | 711/147 |
| 2017/0169326 | A1* | 6/2017 | Diamos | G06N 3/088 |
| 2017/0344880 | A1 | 11/2017 | Nekuii | |
| 2018/0191642 | A1* | 7/2018 | Biederman | H04L 47/22 |
| 2018/0260692 | A1 | 9/2018 | Nagaraja | |

FOREIGN PATENT DOCUMENTS

| | | |
|---|---|---|
| CN | 104899561 A | 9/2015 |
| CN | 105869117 A | 8/2016 |
| CN | 106650925 A | 5/2017 |
| CN | 106682729 A | 5/2017 |
| CN | 106875013 A | 6/2017 |
| CN | 106909971 A | 6/2017 |
| CN | 107451659 A | 12/2017 |
| CN | 107491811 A | 12/2017 |
| CN | 107730905 A | 2/2018 |
| CN | 108196882 A | 6/2018 |
| CN | 108491924 A | 9/2018 |
| CN | 109409513 A | 3/2019 |
| WO | 2018125462 A1 | 7/2018 |

OTHER PUBLICATIONS

Minkovich, Kirill, et al. "HRLSim: A high performance spiking neural network simulator for GPGPU clusters." IEEE transactions on neural networks and learning systems 25.2 (2013): 316-331. (Year: 2013).*

Eldridge, Schuyler, et al. "Towards general-purpose neural network computing." 2015 International Conference on Parallel Architecture and Compilation (PACT). IEEE, 2015. (Year: 2015).*

Sakivama, Kazumasa, et al. "Deep learning on large-scale muticore clusters." 2018 30th International Symposium on Computer Architecture and High Performance Computing (SBAC-PAD). IEEE, Sep. 2018. (Year: 2018).*

Gostovic, Marko, et al. "Experience from porting complex algorithms on heterogeneous multi-core systems." 2017 IEEE 7th International Conference on Consumer Electronics-Berlin (ICCE-Berlin). IEEE, 2017. (Year: 2017).*

Cunial, Lorenzo, et al. "Parallelized convolutions for embedded ultra low power deep learning soc." 2018 IEEE 4th International Forum on Research and Technology for Society and Industry (RTSI). IEEE, Sep. 2018. (Year: 2018).*

Search Report and Written Opinion of Singaporean Application No. 11202103656S issued on Feb. 14, 2023.

International Search Report of the International Searching Authority for China National Intellectual Property Administration in PCT application No. PCT/CN2019/102139 issued on Nov. 27, 2019, which is an international application corresponding to this U.S. application.

The State Intellectual Property Office of People's Republic of China, First Office Action in Patent Application No. 201811180174.5 issued on Jun. 10, 2020, which is a foreign counterpart application corresponding to this U.S. Patent Application, to which this application claims priority.

The State Intellectual Property Office of People's Republic of China, Second Office Action in Patent Application No. 201811180174.5 issued on Oct. 9, 2020, which is a foreign counterpart application corresponding to this U.S. Patent Application, to which this application claims priority.

Notification to grant patent right for invention of Chinese application No. 201811180174.5 issued on Feb. 4, 2021.

Hu-Ming Zhu, et al; "Review of Parallel Deep Neural Network; Chinese Journal of Computers", vol. 41, No. 8; Jan. 19, 2018.

Yumin Wang, et al; "Parallel Algorithm of Convolutional Neural Network in Multi-GPU Environment; Journal of Chinese Computer Systems", Mar. 31, 2017.

Noriyuki Aibe, et al; "A probabilistic neural network hardware system using a learning-parameter parallel architecture; Proceedings of the 2002 International Joint Conference on Neural Networks. IJCNN"02 (Cat. No.02CH37290), Aug. 7, 2002.

Richard Neill, et al; "Automated Analysis of Task-Parallel Execution Behavior Via Artificial Neural Networks", 2018 IEEE International Parallel and Distributed Processing Symposium Workshops (IPDPSW), Aug. 6, 2018.

* cited by examiner

TASK PROCESSING METHOD AND DEVICE BASED ON NEURAL NETWORK

This application is a US national stage of international application No. PCT/CN2019/102139, filed on Aug. 23, 2019, which claims priority to Chinese Patent Application No. 201811180174.5, filed on Oct. 10, 2018. Both applications are herein incorporated by reference in their entireties.

TECHNICAL FIELD

The present disclosure relates to the field of computer network technologies, such as a task processing method and device based on a neural network.

BACKGROUND

With the rapid development of artificial intelligence technologies, machine learning methods represented by deep neural networks have been applied in computer vision, speech recognition and other fields, and have become a research hotspot.

In the actual deployment of a neural network-based application, the attention should be paid to the overall delay and throughput control of the application in addition to computing overheads of the network per se. At present, in the practical application of, especially, a real-time application deployed on a mobile terminal, a multi-core processor is usually adopted to accelerate the computation of each layer in the neural network. That is, computation tasks of each network layer in the neural network are allocated to multiple processor cores for processing, such that the computation of the same layer can be completed by the multiple processor cores.

SUMMARY

Embodiments of the present disclosure provide a task processing method and device based on a neural network.

In a first aspect, a task processing method based on a neural network is provided according to an embodiment of the present disclosure. The method includes: acquiring input data, wherein the input data is intended to trigger thread tasks, and is source input data or cache exchange data; generating processing result data by scheduling at least two corresponding module threads in parallel based on at least two triggered thread tasks to process the input data, wherein the at least two module threads respectively correspond to at least two network modules in the neural network; and outputting the processing result data to a cache as the cache exchange data of module threads except the at least two module threads, or outputting the processing result data as a processing result of the source input data.

In a second aspect, a task processing device based on a neural network is provided according to an embodiment of the present disclosure. The device includes a processor, and a memory storing at least one instruction therein, wherein the instruction, when executed by the processor, causes the device to execute the task processing method based on the neural network according to the first aspect.

In a third aspect, a computer-readable storage medium storing at least one instruction therein is provided, wherein the at least one instruction, when executed by a processor of a device, causes the device to execute the task processing method based on the neural network according to the first aspect.

DETAILED DESCRIPTION

When implementing the present disclosure, the applicant found that computation tasks in a neural network are sequential execution tasks. That is, data input to the neural network is processed in different layers of the neural network sequentially to obtain a final output result. A multi-core processor is often used for accelerating task processing of neural network-related applications in the related art. For example, with respect to applications that do not need to be executed synchronously, such as face recognition in clouds, many similar unrelated tasks are usually assigned to different processor cores by batch processing for computation, so as to acquire a maximum degree of parallelism in theory when the consumed time of each task is close. However, this solution does not support applications that need to be executed synchronously, namely, applications that require real-time echo. For the applications that need to be executed synchronously, namely, in a scene where synchronous execution is required, another solution is usually adopted, which takes a single-layer channel in the neural network as a unit and accelerates the calculation of each layer based on a multi-core processor. For example, an acceleration package nnPack for accelerating the neural network calculation is adopted, or a multiple-processor-cores optimized layer algorithm contained in open-source matrix computing library OpenBlas is adopted for acceleration. Since the only degree of parallelism exists in the single layer of the neural network, this solution is effective in the case that the single layer consumes more time. However, such multi-core cannot effectively be used for acceleration in the case that the single layer consumes less time, because a time spent in allocating the computation tasks to the multiple processor cores and collecting computation results from the multiple cores may be longer than that spent in computation itself, for example, in the case that a time for the single layer is basically less than 0.5 milliseconds, extra overheads caused by scheduling among the multiple cores may be higher than overheads of the computation itself, thereby reducing a speedup ratio. For example, with regard to mobile or real-time neural networks, the number of network layers in the structure is relatively large and the number of single-layer channels is relatively small, and the single layer consumes basically less than 0.5 milliseconds. At this time, additional overheads of multi-core scheduling and overheads of the single-layer network computation are usually about the same, and even multi-core processing is slower than single-core processing. It can be seen that the related art faces a dilemma: for the applications that need to be executed synchronously, the solution using the single-layer channel as the unit is only effective in a case that the single layer consumes more time; and for the application that do not need to be executed synchronously, the consumed time of each task needs to be close in its solution, but this solution is not suitable for the applications that require real-time echo.

The embodiments of the present disclosure provide a novel task processing method based on a neural network. According to the embodiments of the present disclosure, the input data can be processed by scheduling at least two module threads corresponding to network modules of the neural network in parallel, so as to greatly cover up the time consumed in the computation of the neural network and increase the throughput, namely, making full use of the performance of multiple processor cores to accelerate neural network-related applications, enabling the applications to be echoed in real time. The network modules are acquired based on division of the network layers in the neural network in advance. One network module may include at least one network layer, which is not limited in the embodiments of the present disclosure.

In actual practice, in order to accelerate the task processing of the neural network applications by the multi-core processor, the network layers in the neural network may be divided in advance to acquire at least two network modules. Each network module includes at least one network layer. At the beginning of the operation, a thread pool containing at least two threads is created based on the network models acquired after the neural network is divided, and each thread in the thread pool may correspond to execution of a unique network module. In the embodiments of the present disclosure, the threads corresponding to the network modules in the thread pool is called module threads, tasks required to be executed by each network module in the neural network are respectively executed by scheduling the module threads in parallel, such that a speedup ratio is increased, thereby improving the operation efficiency of the neural network-related applications by the multi-core processor.

Figure 1:
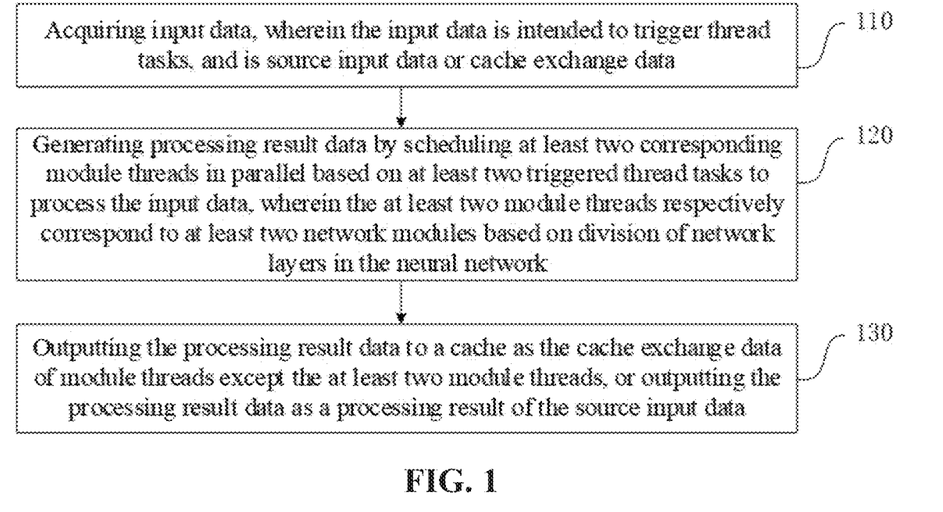
FIG. 1 is a schematic diagram of a flowchart of a task processing method based on a neural network according to an embodiment of the present disclosure.

Referring to FIG. 1, which shows a schematic diagram of a flowchart of a task processing method based on a neural network according to an embodiment of the present disclosure, wherein steps 110 to 130 are included.

In step 110, input data is acquired, wherein the input data is intended to trigger thread tasks, and is source input data or cache exchange data.

According to the embodiment of the present disclosure, in the case that task processing is required, the input data is acquired for tasks currently required to be executed, such that the corresponding thread tasks are triggered for processing based on the currently acquired input data. Here, the currently acquired input data is used for triggering the thread tasks, and includes data related to the task processing, such as the source input data and the cache exchange data, which are not limited in the embodiments of the present disclosure.

It should be noted that the source input data in the embodiment of the present disclosure refers to the source data required for the task processing, such as image frame data required for image recognition tasks. The cache exchange data refers to cache data exchanged between different threads, and the cache data is stored in a cache space.

In step 120, processing result data is generated by scheduling at least two corresponding module threads in parallel based on at least two triggered thread tasks to process the input data, wherein the at least two module threads respectively correspond to at least two network modules in the neural network.

In the embodiment of the present disclosure, after the input data is acquired, the at least two module threads are scheduled in parallel from the thread pool based on the at least two thread tasks triggered by the input data, such that the input data is processed by the at least two scheduled module threads to generate the processing result data. Here, the processing result data refers to result data acquired after the module threads perform task processing based on their corresponding network modules.

For example, after the two module threads, such as a first module thread and a second module thread, are scheduled in parallel, the processing result data is generated after the input data is processed in parallel through the scheduled two module threads, and includes first processing result data and second processing result data which are generated by the two module threads. Here, the first processing result data refers to result data generated after the first module thread performs the task processing based on its corresponding first network module. The second processing result data refers to result data generated after the second module thread performs the task processing based on its corresponding second network module. It should be noted that the first module thread is bound to the first network module to correspond to the execution of the first network module. Similarly, the second module thread is bound to the second network module to correspond to the execution of the second network module.

Of course, in the case that at least three module threads are scheduled in parallel, generated processing result data includes result data acquired after processing by the scheduled at least three module threads, which are not limited in the embodiments of the present disclosure. For example, after the first module thread, the second module thread, and third module thread are scheduled in parallel, processing result data is generated after the acquired source input data or cache exchange data is processed by the first module thread, the second module thread, and the third module thread respectively, and includes the first processing result data generated by the first module thread, the second processing result data generated by the second module thread, the third processing result data generated by the third module thread, and the like.

In step 130, the processing result data is output to a cache as the cache exchange data of module threads except the at least two module threads, or the processing result data is output as a processing result of the source input data.

In the embodiment of the present disclosure, after the module threads generate the processing result data, the processing result data is output based on the network modules corresponding to the module threads. In an exemplary embodiment, in the case that the network module corresponding to the module thread is a start network module or an intermediate network module in the neural network, the processing result data generated by the module thread is output to the cache as the cache exchange data for interacting with the module threads except the at least two module threads. That is, the processing result data generated by the module thread is used as input data of a next module thread, such that the next module thread can perform further task processing, such as executing a task of a next network module in the neural network, based on the processing result data generated by this module thread. In the case that the network module corresponding to the module thread is an end network module in the neural network, processing result data generated by the module thread is determined as a processing result of the source input data, and is output, such that neural network-related applications can use the processing result for business processing, thereby satisfying business requirements.

It should be noted that the processing result of the source input data in the embodiment of the present disclosure is used for characterizing a result output after the source input data is processed by the neural network.

In the embodiment of the present disclosure, the start network module refers to the first network module acquired after the neural network is divided, is configured to receive the source input data transmitted to the neural network, and is further configured to execute a task required to be executed by a network layer contained in the start network module. The start network module includes an input network layer (namely, an input layer of the neural network) for receiving the source input data in the neural network, or further includes at least one other network layer in the neural network, etc., which is not limited in the embodiments of the present disclosure.

Moreover, in the embodiment of the present disclosure, the end network module refers to the last network module acquired after the neural network is divided, is configured to output the processing result of the source input data, and is further configured to execute a task required to be executed by a network layer contained in the end network module. The end network module includes a network layer (namely, an output layer of the neural network) for outputting the processing result in the neural network, or further includes at least one other network layer in the neural network, etc., which is not limited in the embodiments of the present disclosure.

Correspondingly, in the embodiment of the present disclosure, the intermediate network module includes at least one intermediate network layer in the neural network, and refers to a network layer except the first network layer and the last network layer in the neural network. For example, in a case that the neural network includes 5 network layers, the intermediate network module includes a second network layer, a third network layer and a fourth network layer which are sequentially connected in the neural network; or, the intermediate network module includes the third network layer and the fourth network layer; or, the intermediate network module includes the third network layer. In an exemplary embodiment, in a case that the start network module includes the first network layer and the end network module includes the fifth network layer, the intermediate network module includes the second network layer, the third network layer and the fourth network layer; or, in a case that the start network module includes the first network layer and the second network layer which are sequentially connected and the end network module includes the fifth network layer, the intermediate network module includes the third network layer and the fourth network layer; or, in a case that the start network module includes the first network layer and the second network layer which are sequentially connected and the end network module includes the fifth network layer and the fourth network layer, the intermediate network module only includes the third network layer; or the like.

In summary, according to the embodiment of the present disclosure, after the input data used for triggering the thread tasks is acquired, the at least two corresponding model threads can be scheduled in parallel based on the at least two triggered thread tasks, and the input data can be processed, wherein the at least two module threads scheduled in parallel respectively correspond to the at least two network modules based on division of network layers in the neural network. That is, the tasks of the different network modules in the neural network are assigned to the different module threads to be executed in parallel, which greatly covers up the time consumed in the computation of the neural network. Thus, the operating efficiency of the neural network-related applications by the multi-core processor is improved, and the low computation efficiency of the neural network-related applications by the multi-core processor in the related art is avoided, such that real-time applications can make full use of the multi-core computation capability for acceleration, providing a wide application range.

In an embodiment of the present disclosure, the task processing method can be used as an engineering optimization method, and is further applied to various applications deployed based on the neural network as a dependent component, in the form of a library or a source code, of any neural network-related application, such that a device configured with the multiple processor cores can make full use of the performance of the multiple processor cores to accelerate the neural network-related applications, thereby satisfying real-time requirements. For example, relevant multithreading logic may be written based on the method according to the embodiment of the present disclosure, and then integrated into the application in the form of the library or source code, such that the device such as a mobile phone can take full advantage of the multi-core performance for acceleration when processing the computation tasks of this application, thereby making full use of hardware resources.

In another embodiment of the present disclosure, the neural network may be divided in advance to divide the network layers included in the neural network into N network modules, such that the tasks to be executed by the network layers in the neural network can be respectively processed by the N module threads corresponding to the N network modules, thereby enabling the tasks of each network module of the neural network to be executed in parallel. Here, N is an integer greater than 1, and is used for characterizing the number of the network modules acquired after the neural network is divided. Therefore, in an embodiment of the present disclosure, prior to acquiring the input data, the method may further include: acquiring at least two network modules by dividing the network layers in the neural network. It should be noted that each network module acquired after division includes at least one network layer in the neural network, for example, including at least one convolutional layer in a convolutional neural network, and the like, which is not limited in the embodiments of the present disclosure.

In another embodiment of the present disclosure, in order to simplify the complexity of data interaction between different network modules, one network layer with input and output in the neural network is selected as a connection point between the network modules. For example, acquiring the at least two network modules by dividing the network layer in the neural network includes: determining a number of channels between two adjacent network layers in the neural network; dividing a former network layer in the adjacent network layers as an input layer for inputting the network module and dividing a latter network layer in the adjacent network layers as an output layer for outputting the network module in response to determining that one channel is present between the adjacent network layers; and generating the at least two network modules based on the output layer for outputting the network module and the input layer for inputting the network module.

In another embodiment of the present disclosure, when the neural network is divided, a topological structure of the neural network is determined, and network layers included in the neural network can be determined, for example, the convolutional neural network (CNN), including an input layer, a convolutional layer, a sampling layer and the like, can be determined. In addition, the number of channels between the network layers included in the neural network is determined, for example, the number of channels between adjacent network layers in the neural network can be determined. Subsequently, at least two network modules are acquired by dividing the network layers in the neural network based on the number of the channels between the two adjacent network layers in the neural network.

In another embodiment, it can be determined whether to divide the adjacent network layers into different network modules by judging whether one channel is present between adjacent network layers in the neural network. For example, in a case that one channel is present between the two adjacent network layers in the neural network, that is, in the case that one channel is present between the adjacent network layers, it can be determined that a former network layer in the adjacent network layers outputs data to a latter former network in the adjacent network layers through the one channel, and thus the former network layer in the adjacent network layers is divided as an input layer for inputting the network module and the latter network in the adjacent network layers as an output layer for outputting the network module. Subsequently, the at least two network modules are determined based on the output layer for outputting the network module and the input layer for inputting the network module. Here, the data output by the former network layer is used as the input data of the latter network layer, that is, the latter network layer in the adjacent network layers acquires the input data output by the former network layer through the one channel.

In another embodiment, a difference value between processing times of the network modules acquired after the neural network is divided is less than a predetermined threshold. For example, in the embodiment of the present disclosure, the neural network is divided based on the time required for task processing by each network model in the neural network, such that the difference value between the processing times of the network modules acquired after the neural network is divided can be less than the predetermined threshold, thereby balancing resource overheads and parallel performance. In a case that the neural network itself has pre-processing and post-processing sections, each processing section, depending on its time consumption, may be used as a module or a part of a module to participate in the division. That is, based on the processing times of the pre-processing and post-processing sections of the network itself, the pre-processing section of the network itself may be regarded as the module or the part of a module to participate in the division of network modules, and meanwhile, the post-processing section of the network itself may be regarded as the module or the part of a module to participate in the division of the network modules. In actual execution, the consumed time of the pre-processing and post-processing sections of the network itself can be covered up, and thus, the time finally consumed may be equal to a longest processing time of a network module among the modules acquired after the division.

Figure 2:
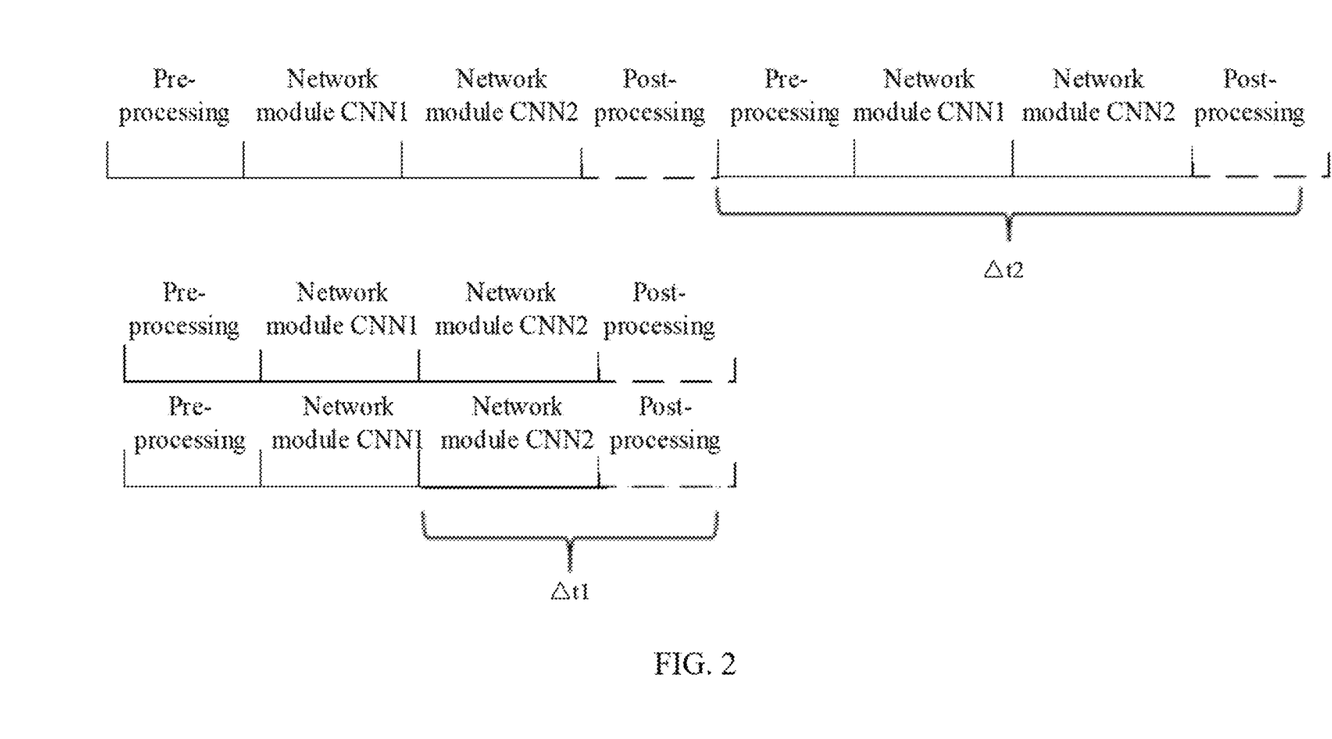
FIG. 2 is a schematic diagram of two module threads executing tasks of two network modules in parallel according to an embodiment of the present disclosure.

In another embodiment, the CNN is split into N network modules in an offline state or an online state, and the consumed times of the network modules is approximately the same. The tasks of each network module is assigned to different module threads to be executed. Each frame of image data that the CNN application needs to process is processed sequentially by the N module threads corresponding to the N network modules acquired after the neural network is divided, and the total consumed time is theoretically unchanged. However, from the overall perspective of the CNN application, the number of the frames of image data processed per unit time is increased by N times. For example, in a case that N is 2, the pre-processing may be executed by the model thread corresponding to the first network module CNN1, and the post-processing may be executed by the model thread corresponding to the second network module CNN2. As shown in FIG. 2, the time $\Delta t1$ required by image frame processing may be shortened to half of the time $\Delta t2$ required by an original serial execution method, such that the number of frames corresponding to image frame data processed by the CNN application per unit time is increased, a refresh time of the image frames is shortened, and a frame rate displayed by the CNN application is increased, thereby improving the user experience.

It can be seen that, according to the processing method based on the neural network provided by the embodiment of the present disclosure, the processing of the adjacent image frame data can be incorporated into the parallel processing. That is, the adjacent image frame data is processed in parallel by the at least two scheduled network modules, such that the multi-core is fully utilized for acceleration on the premise of keeping the execution sequence of the image frames.

In another embodiment, the module threads are bound to the processor cores in one-to-one correspondence, such that the tasks of the network modules after division can be executed in parallel by the plurality of different processor cores, and the CNN application can be accelerated by the multi-core processor. That is, the multiple cores can be effectively utilized for acceleration, and the purpose of making full use of hardware resources can be achieved. For example, on some devices equipped with graphics processing units (GPUs), in case that the CNN application performs operations such as rendering and display on the devices, the task processing method according to the embodiments of the present disclosure may be adopted to accelerate the computation tasks that the CNN application needs to execute by using idle GPU resources, such that time consumed in the computation of the CNN can be greatly covered up, thereby satisfying real-time requirements.

In another embodiment, the at least two module threads may at least include a start module thread and an end module thread. The start module thread refers to a thread corresponding to the start network module acquired after the neural network is divided, and is used for executing a task of the start network module. The end module thread refers to a thread corresponding to the end network module acquired after the neural network is divided, and is used for executing a task of the end network module. Scheduling the at least two corresponding module threads in parallel based on the at least two triggered thread tasks to process the input data includes: scheduling the start module thread based on the triggered thread task to process the input data; and scheduling the end module thread based on the triggered thread task to process the input data.

In another embodiment, scheduling the start module thread based on the triggered thread task to process the input data includes: calling the start module thread to pre-process the source input data, performing task processing based on the start network module of the neural network corresponding to the start module thread, and outputting the processing result data to the cache as the cache exchange data. Scheduling the end module thread based on the triggered thread task to process the input data includes: calling the end module thread to acquire the corresponding cache exchange data from the cache as the input data, performing task processing based on the end network module of the neural network corresponding to the end module thread, and post-processing and outputting processing result data as the processing result of the source input data.

Figure 3:
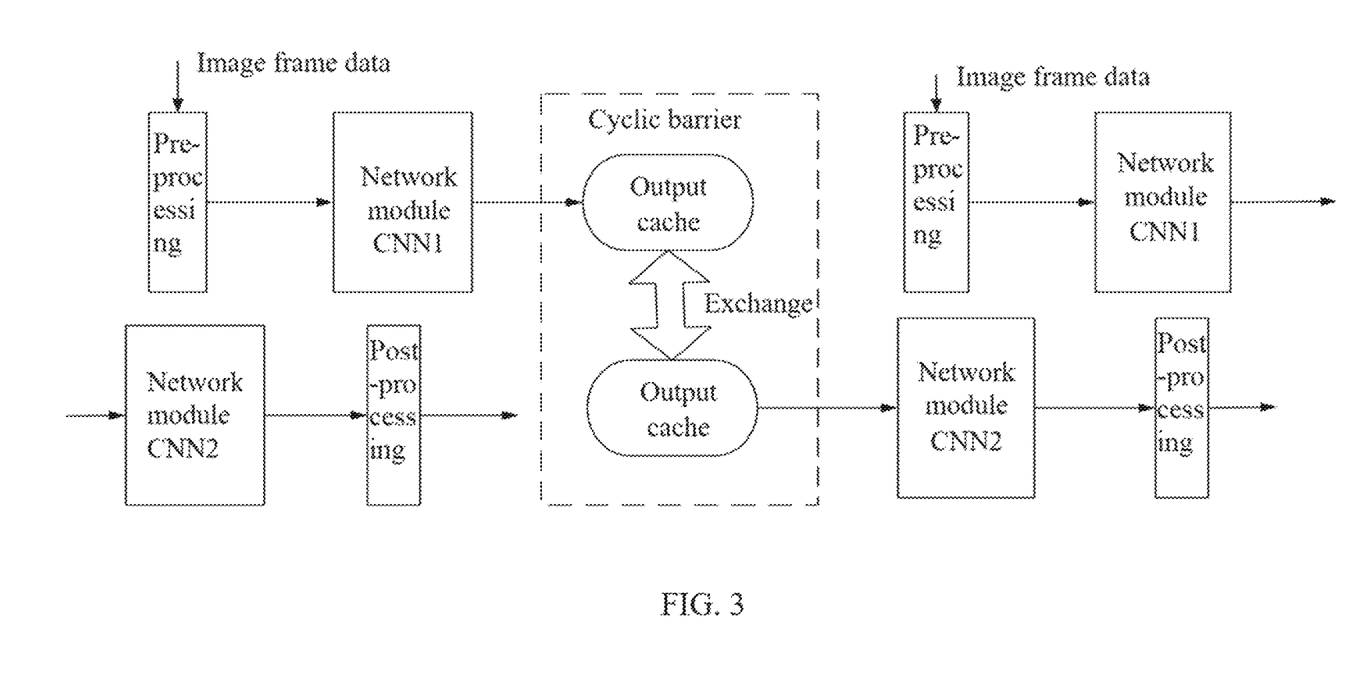
FIG. 3 is a schematic diagram of data exchange between two module threads according to an embodiment of the present disclosure.

In another embodiment, after the network layers in the convolutional neural network are divided into two network modules, the first and second network modules CNN1 and CNN2 acquired after the division is called the start network module and the end network module. In addition, the thread bound to the start network module is called the start module thread, and the thread bound to the end network module is called the end module thread. As shown in FIG. 3, after input image frame data is acquired, the start module thread corresponding to the first network module CNN1 is scheduled based on a thread task triggered by the image frame data to pre-process the input image frame data; task processing is performed based on the start network module (namely, the first network module CNN1) of the neural network to generate first processing result data; and the first processing result data is output to the cache, such that the first processing result data is used as the cache exchange data to be transmitted to the end module thread corresponding to the second network module CNN2 in a synchronization stage. That is, the cache exchange data is used as the input data of the end module thread to trigger the end module thread for task processing based on the second network module CNN2.

It should be noted that the new image frame data is written into the input cache corresponding to the start module thread in the synchronization phase, and the first processing result data output by the start module thread is used as the exchange cache data to be exchanged into an input cache corresponding to the end module thread as the input of the end module thread through ping-pong cache exchange. As shown in FIG. 3, the first processing result data output by the start module thread to the output cache is exchanged into the input cache corresponding to the end module thread through a preset cyclic barrier as the input of the end module thread, such that the end module thread can acquire the first processing result data generated by the start network module from its input cache for next task processing.

In another embodiment of the present disclosure, the neural network is a convolutional neural network; and the acquired source input data is image frame data. Accordingly, the pre-processing is image pre-processing, and the post-processing is image post-processing. After the image post-processing, other processing, such as image rendering processing, is performed, which is not limited in the embodiments of the present disclosure.

In another embodiment, the above module threads further include at least one intermediate module thread. For example, the network modules acquired after the neural network is divided further includes at least one intermediate network module. Therefore, the at least two module threads scheduled in parallel further includes at least one intermediate module thread corresponding to the intermediate network module, and the intermediate module thread is used for executing a task of the intermediate network module. Scheduling the at least two corresponding module threads in parallel based on the at least two triggered thread tasks to process the input data includes: scheduling the at least one intermediate module thread based on the triggered thread task to process the input data.

In another embodiment, scheduling the at least one intermediate module thread based on the triggered thread task to process the input data includes: calling the at least one intermediate module thread to acquire corresponding cache exchange data from the cache as the input data, performing task processing based on the intermediate network module of the neural network, and outputting processing result data to the cache as cache exchange data. In an exemplary embodiment of the present disclosure, the intermediate thread task is triggered based on the cache exchange data output by the start module thread in the task processing process; the intermediate module thread corresponding to the intermediate network module of the neural network is called based on the triggered intermediate thread task to perform task processing on the cache exchange data output by the start module thread to generate intermediate processing result data; and the intermediate processing result data is output to the cache as cache exchange data for data exchange with a next intermediate module thread or the end module thread.

Figure 4:
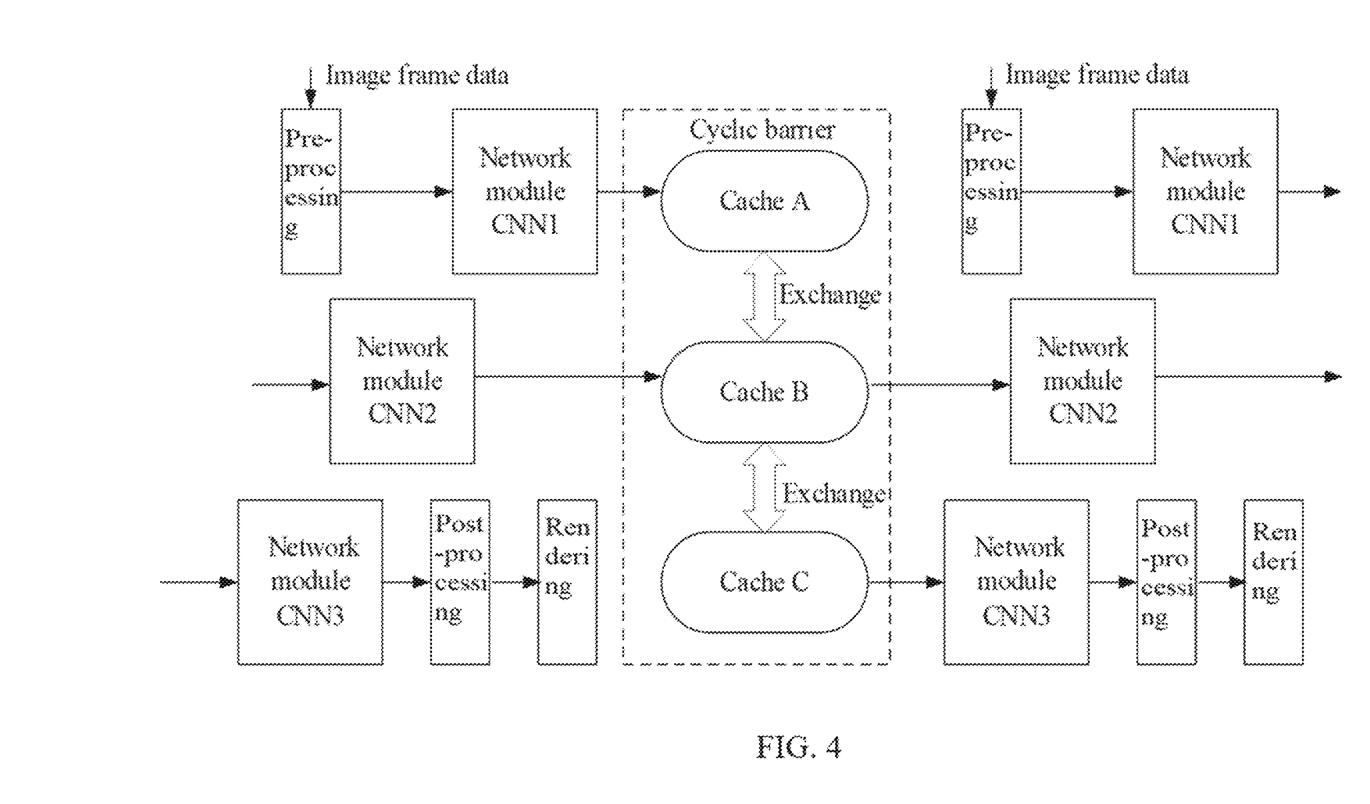
FIG. 4 is a schematic diagram of data exchange among a start module thread, an intermediate module thread, and an end module thread according to an embodiment of the present disclosure.

Since the network modules acquired after the neural network is divided can correspond to the module threads one by one, as shown in FIG. 4, after the network layers in the convolutional neural network are divided into three network modules, the first network module CNN1, the second network module CNN2 and the third network module CNN3 which are acquired after the division is called the start network module, the intermediate network module, and the end network module, respectively. The module thread corresponding to the first network module CNN1 is called the start module thread, the module thread corresponding to the second network module CNN2 is called the intermediate module thread, and the module thread corresponding to the third network module CNN3 is called the end module thread. In addition, the network modules and the module threads may have a one-to-one corresponding connection relationship. Thus, the data exchange between every two module threads is implemented by monitoring the unique consumption threads related thereto.

For example, as shown in FIG. 4, the start module thread performs image pre-processing on input image frame data, performs task processing based on the first network module CNN1 of the neural network to generate first processing result data, and outputs the first processing result data to a cache A. The intermediate module thread acquires the cache exchange data written in a target cache space corresponding to the thread task that the intermediate module thread needs to execute, performs task processing based on the second network module CNN2 of the neural network to generate intermediate processing result data, and outputs the intermediate processing result data to a cache B. The end module thread acquires the cache exchange data written into the target cache space (namely, a cache C in FIG. 4) corresponding to the thread task that the end module thread needs to execute, performs task processing based on the third network module CNN3 of the neural network, subsequently performs image post-processing and rendering on processing result data acquired after the task processing to acquire a processing result of the source input data, and performs output based on the processing result, such as display on an application interface of a convolutional neural network-related application.

In the process of data exchange, a data exchange sequence is from back to front in turn. As shown in FIG. 4, data between the cache B and the cache C is exchanged first, and data between the cache A and the cache C that is exchanged to the second thread is exchanged. That is, the data exchange sequence is opposite to the execution sequence of module threads. In another embodiment, the consumed time of the second network module CNN2 is approximately equal to that of the first network module CNN1 and image pre-processing, or is approximately equal to that of the third network module CNN3 and post-processing, such that the triggered three module thread has the highest efficiency.

In another embodiment, acquiring the input data includes: determining a triggering condition for generating the thread tasks in a case that it is monitored that data is written in a target cache space correspondingly read by the thread tasks, and determining the data written in the target cache space as the input data, wherein the module threads are bound to the thread tasks in one-to-one correspondence, and the thread tasks are bound to the target cache space. In an exemplary embodiment of the present disclosure, whether the triggering condition of the thread tasks is generated is determined by whether the data is written in the target cache space correspondingly read by the thread tasks. If it is monitored that the data is written in the target cache space correspondingly read by the thread tasks, it is determined that the triggering condition for generating the thread tasks is generated, and the data written in the target cache space is used as the input data to trigger corresponding thread tasks based on the input data. After the input data is acquired from the target cache space, the corresponding module threads is scheduled in parallel based on the triggered thread tasks to complete the task processing of the input data.

In summary, according to the embodiment of the present disclosure, the complete design network is divided into the plurality of network modules similar in time consumptions. Each network module corresponds to one module thread, such that the tasks of the different network modules can be assigned to the different module threads for execution. In addition, each module thread is assigned to the different processor cores, such that the tasks of the different network modules can be executed through the different processor cores, thereby fully utilizing the hardware resources. For example, graphics processor resources of devices, and multi-core performance of mobile devices such as mobile phones are fully utilized. Thus, real-time applications can also make full use of the multi-core computation capacity for acceleration, thereby increasing the throughput, and greatly covering up the time consumed in the network computation. For instance, the operation efficiency of the convolutional neural network-related applications by the multi-core processor is improved, and the CNN-related applications are accelerated, satisfying the real-time requirements.

In addition, in the embodiment of the present disclosure, the pre-processing and post-processing sections required by the neural network application may be used as a third-party module to join in the division of the network layers, such that the overheads of data processing, display, rendering and the like are reduced. Moreover, in the embodiment of the present disclosure, the module threads are bound to the thread tasks, such that data synchronization between the different module threads can be completed only through the simple ping-pong cache. Thus, the data synchronization overheads between the multiple threads are reduced, low multithreading efficiency caused by excessive synchronization overheads is avoided, and applications having synchronous requirements are supported without changing the execution order of the tasks corresponding to the image frame data.

It should be noted that in order to simply describe the embodiments of the method, the embodiments are described as a series of combined actions. However, it should be understood by those skilled in the art that the embodiments of the present disclosure are not limited by described sequences of the actions. Therefore, some steps may be implemented in other sequences or simultaneously based on the embodiments of the present disclosure.

Figure 5:
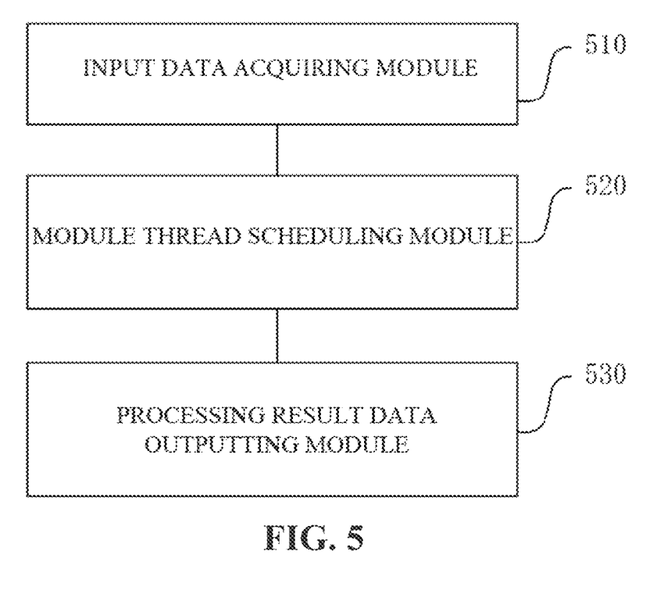
FIG. 5 is a schematic structural block diagram of a task processing apparatus based on a neural network according to an embodiment of the present disclosure.

Referring to FIG. 5, which shows a structural block diagram of a task processing apparatus based on a neural network according to an embodiment of the present disclosure, the task processing apparatus based on the neural network includes an input data acquiring module 510, a module thread scheduling module 520, and a processing result data outputting module 530.

The input data acquiring module 510 is configured to acquire input data, wherein the input data is intended to trigger thread tasks, and is source input data or cache exchange data.

The module thread scheduling module 520 is configured to generate processing result data by scheduling at least two corresponding module threads in parallel based on at least two triggered thread tasks to process the input data, wherein the at least two module threads respectively correspond to at least two network modules in the neural network.

The processing result data outputting module 530 is configured to output the processing result data to a cache as the cache exchange data of module threads except the at least two module threads, or output the processing result data as a processing result of the source input data.

In an embodiment, the task processing apparatus based on the neural network further includes: a network layer division module. The network layer division module is configured to acquire at least two network modules by dividing the network layers in the neural network.

In another embodiment, the network layer division module may include a channel number determination sub-module, a network layer division sub-module, and a network module generation module.

The channel number determination sub-module is configured to determine a number of channels between adjacent network layers in the neural network.

The network layer division sub-module is configured to divide a former network layer in the adjacent network layers as an input layer for inputting the network module and divide a latter network layer in the adjacent network layers as an output layer for outputting the network module in response to determining that one channel is present between the adjacent network layers.

The network module generation module is configured to generate the at least two network modules based on the output layer for outputting the network module and the input layer for inputting the network module.

In another embodiment, a difference value between processing times of the network modules is less than a predetermined threshold.

In another embodiment, the at least two module threads may at least include a start module thread and an end module thread. The module thread scheduling module 520 is configured to schedule the start module thread based on the triggered thread task to process the input data, and schedule the end module thread based on the triggered thread task to process the input data. Here, scheduling the start module thread based on the triggered thread task to process the input data may include: calling the start module thread to pre-process the source input data, performing task processing based on a start network module of the neural network corresponding to the start module thread, and outputting the processing result data to the cache as the cache exchange data. Scheduling the end module thread based on the triggered thread task to process the input data includes: calling the end module thread to acquire the corresponding cache exchange data from the cache as the input data, performing task processing based on an end network module of the neural network corresponding to the end module thread, and post-processing and outputting processing result data as the processing result of the source input data.

In another embodiment, the module thread scheduling module 520 includes a start module thread scheduling sub-module and an end module thread scheduling sub-module.

The start module thread scheduling sub-module is configured to call a start module thread to pre-process the source input data, perform task processing based on a start network module of the neural network corresponding to the start module thread, and output the processing result data to the cache as the cache exchange data.

The end module thread scheduling sub-module is configured to call an end module thread to acquire the corresponding cache exchange data from the cache as the input data, perform task processing based on an end network module of the neural network corresponding to the end module thread, and post-process and output processing result data as the processing result of the source input data.

Of course, in the embodiment of the present disclosure, the module thread scheduling module 520 may further include other sub-modules. For example, the module thread scheduling module 520 may further include at least one intermediate module thread scheduling sub-module configured to schedule an intermediate module thread based on the triggered thread task to process the input data to generate processing result data corresponding to the intermediate module thread; and the like. In another embodiment, the processing result data corresponding to the intermediate module thread may be output to the cache as the cache exchange data, and the cache exchange data may be used as input data of a next module thread related to the intermediate module thread, such that the next module thread can acquire the cache exchange data for task processing.

In another embodiment, the module threads may further include at least one intermediate module thread. The module thread scheduling module 520 is configured to schedule the at least one intermediate module thread based on the triggered thread task to process the input data. Here, scheduling the at least one intermediate module thread based on the triggered thread task to process the input data includes: calling the at least one intermediate module thread to acquire corresponding cache exchange data from the cache as the input data, performing task processing based on the intermediate network module of the neural network, and outputting the processing result data to the cache as the cache exchange data.

The module thread scheduling module 520 may further include an intermediate module thread scheduling sub-module. The intermediate module thread scheduling sub-module is configured to call the intermediate module thread to acquire corresponding cache exchange data from the cache as the input data, perform task processing based on the intermediate network module of the neural network, and output the processing result data to the cache as the cache exchange data.

In another embodiment, the source input data may be image frame data, the pre-processing may be image pre-processing, the post-processing may be image rendering processing, and the neural network may be a convolutional neural network.

In another embodiment, the input data acquiring module 510 includes a monitoring sub-module and a determining sub-module.

The monitoring sub-module is configured to monitor a target cache space correspondingly read by the thread tasks, for example, monitor whether data is written in the target cache space correspondingly read by the thread tasks, and the like.

The determining sub-module is configured to determine a triggering condition for generating the thread tasks in response to monitoring, by the sub-module monitors, the data is written in the target cache space correspondingly read by the thread tasks, and determining the data written in the target cache space as the input data. Here, the module threads are bound to the thread tasks in one-to-one correspondence, and the thread tasks are bound to the target cache space.

In another embodiment, the thread tasks are bound to the processor cores in one-to-one correspondence.

It should be noted that the above task processing apparatus based on the neural network can execute the task processing method based on the neural network according to any embodiment of the present disclosure.

In another embodiment, the above task processing apparatus based on the neural network may be integrated in a device. The device may be composed of at least two physical entities or one physical entity. For example, the device may be a personal computer (PC), a computer, a mobile phone, a tablet device, a personal digital assistant, a server, a messaging device, a game console, or the like.

A device is provided according to an embodiment of the present disclosure. The device includes a processor and a memory. The memory stores at least one instruction therein, wherein the instruction, when executed by the processor, causes the device to execute the task processing method based on the neural network according to any of the method embodiments.

Figure 6:
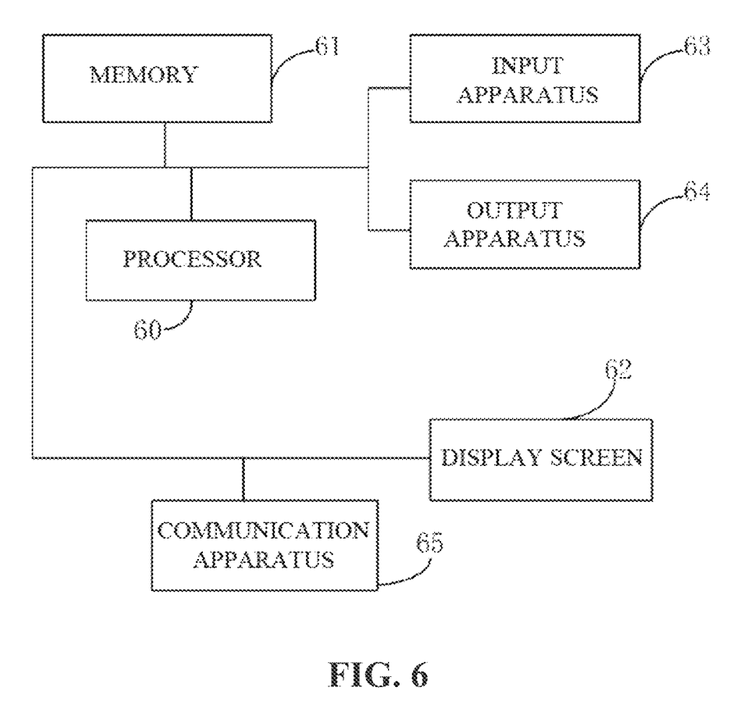
FIG. 6 is a schematic structural block diagram of a device according to an embodiment of the present disclosure.

FIG. 6 shows a schematic structural diagram of a device according to an embodiment of the present disclosure. As shown in FIG. 6, the device includes: a processor 60, a memory 61, a display screen 62 with a touch function, an input apparatus 63, an output apparatus 64, and a communication apparatus 65. The number of the processors 60 in the device may be at least one and the number of the memories 61 in the device may be at least one. In FIG. 6, one processor 60 is taken as an example and one memory 61 is taken as an example. The processor 60, the memory 61, the display screen 62, the input apparatus 63, the output apparatus 64, and the communication apparatus 65 of the device may be connected by a bus or other means. In FIG. 6, the connection by a bus is taken as an example.

As a computer-readable storage medium, the memory 61 is configured to store software programs, computer-executable programs, and modules, such as program instructions/modules (for example, the input data acquiring module 510, the module thread scheduling module 520, the processing result data outputting module 530, and the like in the above task processing apparatus) corresponding to the task processing method described in any embodiment of the present disclosure. The memory 61 may mainly include a program storage region and a data storage area. The program storage region may store an operation apparatus program, and an application program required by at least one function. The data storage region may store data created based on the use of the device, and the like. In addition, the memory 61 may include a high-speed random access memory, and may further include a non-volatile memory, such as at least one magnetic disk storage device, a flash memory device, or other non-volatile solid-state storage devices. In some examples, the memory 61 further includes memories which are remotely disposed relative to the processor 60, and these remote memories may be connected to the device through networks. Examples of the networks include, but are not limited to, the Internet, an intranet, a local area network, a mobile communication network, and combinations thereof.

The display screen 62 is provided with a touch function, and may be a capacitive screen, an electromagnetic screen or an infrared screen. In general, the display screen 62 is configured to display data based on instructions of the processor 60, and is further configured to receive touch operations on the display screen 62 and send corresponding signals to the processor 60 or other devices. In an exemplary embodiment, in a case that the display screen 62 is the infrared screen, the display screen 62 further includes an infrared touch frame. The infrared touch frame is disposed around the display 62, and is configured to receive an infrared signal and send the infrared signal to the processor 60 or other devices.

The communication apparatus 65 is configured to establish a communication connection with other devices, and may be at least one of a wired communication apparatus and a wireless communication apparatus.

The input apparatus 63 is configured to receive input digital or character information, and generate key signal input related to user settings and function control of the device, and is further configured as a camera for acquiring images and a sound pickup device for acquiring audio data. The output apparatus 64 may include an audio device such as a speaker. It should be noted that the composition of the input apparatus 63 and the output apparatus 64 may be set based on actual conditions.

The processor 60 executes various functional applications and data processing of the device by running software programs, instructions, and modules stored in the memory 61, so as to realize the above task processing method based on the neural network.

In another embodiment, at least one program stored in the memory 61, when executed by the processor 60, causes the processor 60 to implement the following operations: acquiring input data, wherein the input data is intended to trigger thread tasks, and is source input data or cache exchange data; generating processing result data by scheduling at least two corresponding module threads in parallel based on at least two triggered thread tasks to process the input data, wherein the at least two module threads respectively correspond to at least two network modules based on division of network layers in the neural network; and outputting the processing result data to a cache as the cache exchange data of module threads except the at least two module threads, or outputting the processing result data as a processing result of the source input data.

A computer-readable storage medium storing at least one instruction therein is further provided according to an embodiment of the present disclosure. The at least one instruction, when executed by a processor of a device, causes the device to execute the task processing method based on the neural network according to the any of the above method embodiments. In an exemplary embodiment, the task processing method based on the neural network includes: acquiring input data, wherein the input data is intended to trigger thread tasks, and is source input data or cache exchange data; generating processing result data by scheduling at least two corresponding module threads in parallel based on at least two triggered thread tasks to process the input data, wherein the at least two module threads respectively correspond to at least two network modules based on division of network layers in the neural network; and outputting the processing result data to a cache as the cache exchange data of module threads except the at least two module threads, or outputting the processing result data as a processing result of the source input data.

It should be noted that, for the apparatus, device, and storage medium embodiments, the description thereof is relatively simple since they are basically similar to the method embodiments, and related parts thereof may refer to the partial description of the method embodiments.

Through the above description of the embodiments, those skilled in the art can clearly know that the present disclosure may be implemented by software and necessary general-purpose hardware, and of course, may also be implemented by hardware. Based on such understanding, essentially, the above technical solutions of the present disclosure or parts contributing to the related arts may be embodied in the form of a software product. The computer software product may be stored in a computer-readable storage medium, such as a computer floppy disk, a read-only memory (ROM), a random access memory (RAM), a flash memory (FLASH), a hard disk, an optical disk, or the like, which includes a plurality of instructions to enable a computer device (which may be a robot, a personal computer, a server, a network device, or the like) to execute the task processing method based on the neural network according to any embodiment of the present disclosure.

It is worth noting that the all units and modules included in the above task processing apparatus based on the neural network are only divided based on functional logic, but are not limited to the above division as long as the corresponding function can be realized. In addition, the names of each functional unit are only for the convenience of distinguishing each other, and are not used for limiting the protection scope of the present disclosure.

It should be understood that various portions of the present disclosure may be implemented by hardware, software, firmware, or a combination thereof. In the above embodiments, multiple steps or methods may be implemented with software or firmware stored in the memory and executed by a suitable instruction execution apparatus. For example, if the multiple steps or methods are implemented in hardware, like the implementation in another embodiment, the multiple steps or methods may be implemented by using any one or a combination of the following techniques well known in the art: a discrete logic circuit provided with a logic gate circuit configured to realize logic functions of data signals, an application-specific integrated circuit having a suitable combinational logic gate circuit, a programmable gate array (PGA), a field programmable gate array (FPGA), and the like.

In the description of the present disclosure, the description of referring terms such as "an embodiment", "some embodiments", "an exemplary example", "specific examples" or "some examples" means specific features, structures, materials or characteristics described in combination with the embodiment or example are included in at least one embodiment or example of the present disclosure. In the description, the schematic representation of the terms does not necessarily refer to the same embodiment or example. Furthermore, the described particular features, structures, materials, or characteristics may be combined in any suitable manner in any one or more embodiments or examples.

What is claimed is:

1. A task processing method based on a neural network, applied in a neural network-related application of a device, comprising:
   acquiring input data, wherein the input data is intended to trigger thread tasks, and is source input data or cache exchange data;
   generating processing result data by scheduling at least two corresponding module threads in parallel based on at least two triggered thread tasks to process the input data, wherein the at least two module threads respectively correspond to at least two network modules in the neural network;
   outputting the processing result data to a cache, wherein the processing result data is used as the cache exchange data of module threads except the at least two module threads, or outputting the processing result data, wherein the processing result data is used as a processing result of the source input data;
   wherein the at least two module threads at least comprise a start module thread and an end module thread;
   wherein generating the processing result data by scheduling at least two corresponding module threads in parallel based on at least two triggered thread tasks to process the input data comprises:
      scheduling the start module thread based on the triggered thread task to process input data to the start module thread; and
      scheduling the end module thread based on the triggered thread task to process input data to the end module thread; and
   executing tasks of the scheduled start module thread on a first core of a multi-core processor and executing tasks of the scheduled end module thread on a different core of the multi-core processor.

2. The method according to claim 1, wherein prior to acquiring the input data, the method further comprises:
   acquiring the at least two network modules by dividing a plurality of network layers in the neural network.

3. The method according to claim 2, wherein acquiring the at least two network modules by dividing the plurality of network layers in the neural network comprises:
   determining a number of channels between adjacent network layers in the neural network;
   identifying a former network layer in the adjacent network layers as an input layer for inputting a network module and identifying a latter network layer in the adjacent network layers as an output layer for outputting the network module in response to determining that one channel is present between the adjacent network layers; and
   generating the at least two network modules based on the output layer for outputting the network module and the input layer for inputting the network module.

4. The method according to claim 1, wherein a difference value between processing times of the at least two network modules is less than a predetermined threshold.

5. The method according to claim 1, wherein
   scheduling the start module thread based on the triggered thread task to process input data to the start module thread comprises: calling the start module thread to pre-process the source input data, performing task processing based on a start network module of the neural network corresponding to the start module thread, and outputting the processing result data to the cache as the cache exchange data; and
   scheduling the end module thread based on the triggered thread task to process input data to the end module thread comprises: calling the end module thread to acquire the corresponding cache exchange data from the cache as the input data, performing task processing based on an end network module of the neural network corresponding to the end module thread, and post-processing and outputting processing result data as the processing result of the source input data.

6. The method according to claim 1, wherein the at least two module threads further comprise at least one intermediate module thread; and scheduling the at least one intermediate module thread based on the triggered thread task to process the input data comprises:
   calling the at least one intermediate module thread to acquire the corresponding cache exchange data from the cache as input data to the intermediate module thread, performing task processing based on an intermediate network module of the neural network corresponding to the intermediate module thread, and outputting the processing result data to the cache as the cache exchange data.

7. The method according to claim 1, wherein the source input data is image frame data, the pre-processing is image pre-processing, the post-processing is image post-processing, and the neural network is a convolutional neural network.

8. The method according to claim 1, wherein acquiring the input data comprises:
   determining the data written in a target cache space as the input data in response to monitoring that data is written in a target cache space correspondingly read by the thread tasks, wherein the module threads are bound to the thread tasks in one-to-one correspondence, and the thread tasks are bound to the target cache space.

9. The method according to claim 1, wherein the module threads are bound to processor cores in one-to-one correspondence.

10. A task processing device based on a neural network, comprising: a multi-core processor and a memory storing at least one instruction therein;
    wherein the instruction, when executed by the multi-core processor, causes the device to execute a task processing method comprising:
    acquiring input data, wherein the input data is intended to trigger thread tasks, and is source input data or cache exchange data;
    generating processing result data by scheduling at least two corresponding module threads in parallel based on at least two triggered thread tasks to process the input data, wherein the at least two module threads respectively correspond to at least two network modules in the neural network;
    outputting the processing result data to a cache, wherein the processing result data is used as the cache exchange data of module threads except the at least two module threads, or outputting the processing result data, wherein the processing result data is used as a processing result of the source input data;
    wherein the at least two module threads at least comprise a start module thread and an end module thread;
    wherein generating the processing result data by scheduling at least two corresponding module threads in parallel based on at least two triggered thread tasks to process the input data comprises:

scheduling the start module thread based on the triggered thread task to process input data to the start module thread; and
scheduling the end module thread based on the triggered thread task to process input data to the end module thread; and
executing tasks of the scheduled start module thread on a first core of the multi-core processor and executing tasks of the scheduled end module thread on a different core of the multi-core processor.

11. The device according to claim 10, wherein prior to acquiring the input data, the method further comprises:
acquiring the at least two network modules by dividing a plurality of network layers in the neural network.

12. The device according to claim 11, wherein acquiring the at least two network modules by dividing the plurality of network layers in the neural network comprises:
determining a number of channels between adjacent network layers in the neural network;
identifying a former network layer in the adjacent network layers as an input layer for inputting a network module and identifying a latter network layer in the adjacent network layers as an output layer for outputting the network module in response to determining that one channel is present between the adjacent network layers; and
generating the at least two network modules based on the output layer for outputting the network module and the input layer for inputting the network module.

13. The device according to claim 10, wherein a difference value between processing times of the at least two network modules is less than a predetermined threshold.

14. The device according to claim 10, wherein scheduling the start module thread based on the triggered thread task to process the input data to the start module thread comprises:
calling the start module thread to pre-process the source input data, performing task processing based on a start network module of the neural network corresponding to the start module thread, and outputting the processing result data to the cache as the cache exchange data; and
scheduling the end module thread based on the triggered thread task to process the input data to the end module thread comprises: calling the end module thread to acquire the corresponding cache exchange data from the cache as the input data, performing task processing based on an end network module of the neural network corresponding to the end module thread, and post-processing and outputting processing result data as the processing result of the source input data.

15. The device according to claim 10, wherein the at least two module threads further comprise at least one intermediate module thread; and scheduling the at least one intermediate module thread based on the triggered thread task to process the input data comprises:
calling the at least one intermediate module thread to acquire the corresponding cache exchange data from the cache as input data to the intermediate module thread, performing task processing based on an intermediate network module of the neural network corresponding to the intermediate module thread, and outputting the processing result data to the cache as the cache exchange data.

16. The device according to claim 10, wherein the source input data is image frame data, the pre-processing is image pre-processing, the post-processing is image post-processing, and the neural network is a convolutional neural network.

17. The device according to claim 10, wherein acquiring the input data comprises:
determining data written in a target cache space as the input data in response to monitoring that data is written in a target cache space correspondingly read by the thread tasks, wherein the module threads are bound to the thread tasks in one-to-one correspondence, and the thread tasks are bound to the target cache space.

18. A non-transitory computer-readable storage medium, storing at least one instruction therein, wherein the at least one instruction, when executed by a multi-core processor of a device, causes the device to execute a task processing method based on a neural network comprising:
acquiring input data, wherein the input data is intended to trigger thread tasks, and is source input data or cache exchange data;
generating processing result data by scheduling at least two corresponding module threads in parallel based on at least two triggered thread tasks to process the input data, wherein the at least two module threads respectively correspond to at least two network modules in the neural network;
outputting the processing result data to a cache, wherein the processing result data is used as the cache exchange data of module threads except the at least two module threads, or outputting the processing result data, wherein the processing result data is used as a processing result of the source input data;
wherein the at least two module threads at least comprise a start module thread and an end module thread;
wherein generating the processing result data by scheduling at least two corresponding module threads in parallel based on at least two triggered thread tasks to process the input data comprises:
scheduling the start module thread based on the triggered thread task to process input data to the start module thread; and
scheduling the end module thread based on the triggered thread task to process input data to the end module thread; and
executing tasks of the scheduled start module thread on a first core of the multi-core processor and executing tasks of the scheduled end module thread on a different core of the multi-core processor.

* * * * *